Patented Nov. 28, 1922.

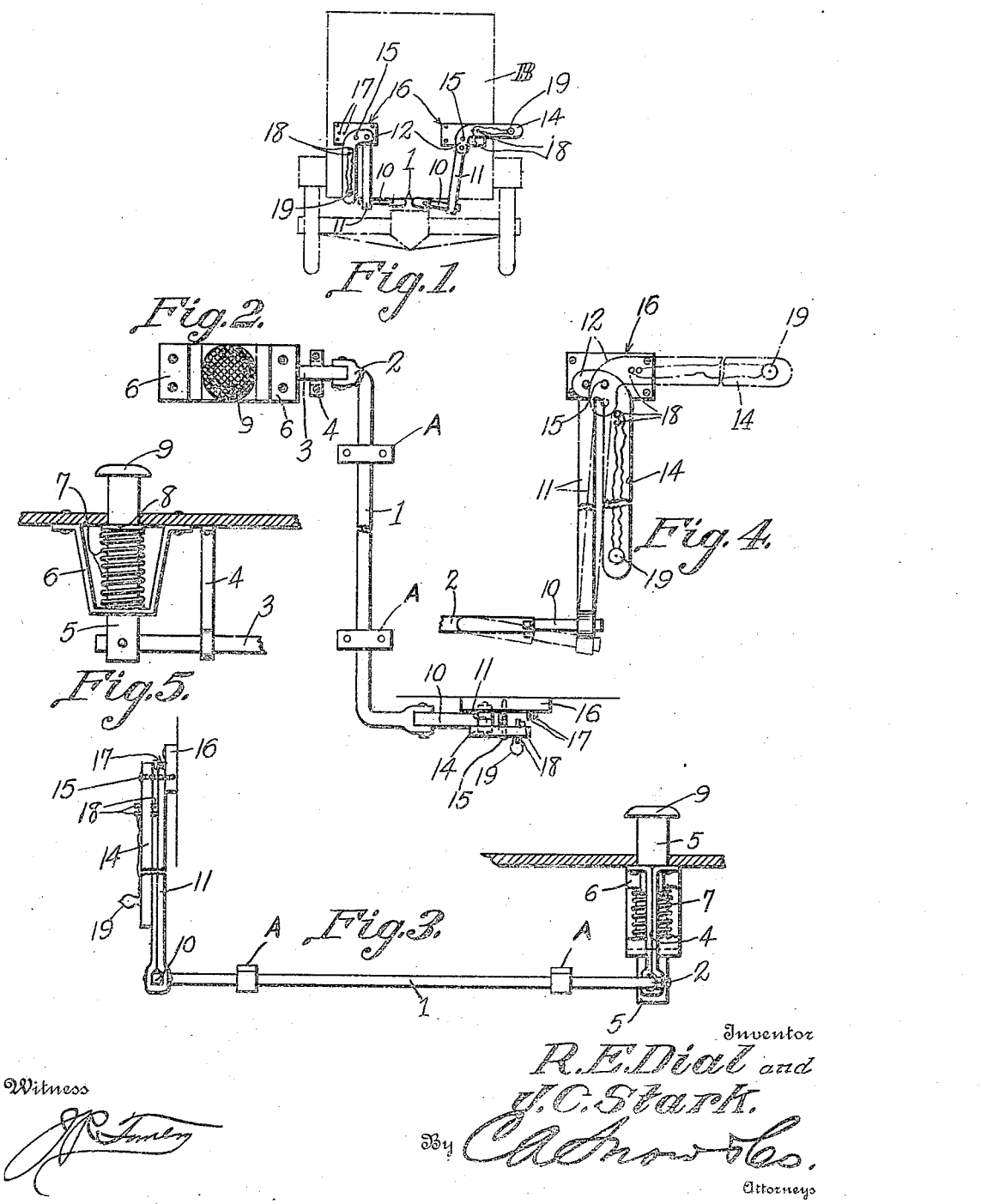

1,436,865

UNITED STATES PATENT OFFICE.

ROBERT E. DIAL AND JOSEPH C. STARK, OF ATHERTON, INDIANA.

AUTOMOBILE SIGNAL.

Application filed August 15, 1919. Serial No. 317,789.

*To all whom it may concern:*

Be it known that we, ROBERT E. DIAL and JOSEPH C. STARK, citizens of the United States, residing at Atherton, in the county of Vigo, State of Indiana, have invented a new and useful Automobile Signal, of which the following is a specification.

This invention relates to a direction signal for automobiles, its object being to provide simple and efficient mechanism whereby, when a foot piece is depressed by the driver, a semaphore arm at the back of the vehicle will be raised to indicate the direction of movement of the car.

Another object is to provide a structure of this character which can be attached readily to a vehicle and will not detract from the appearance thereof or take up an objectionable space thereon.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings

Figure 1 is a rear elevation, on a reduced scale, of the apparatus in position upon a vehicle, said vehicle being indicated by dotted lines.

Figure 2 is a plan view of the attachment.

Figure 3 is a side elevation thereof, the bracket of the foot piece being shown in section.

Figure 4 is a rear elevation of the portion of the device, one of its positions being indicated by dotted lines.

Figure 5 is a detail view of the foot piece.

Referring to the figures by characters of reference, 1 designates a longitudinal shaft mounted on suitable bearings A on the bottom of the vehicle body B and extending laterally from the front end of this shaft is a crank arm 2 engaging one end of a transverse lever 3 fulcrumed in a bracket 4. The other end of this lever is connected to a plunger 5 slidably mounted in a bracket 6 depending from the bottom of the body B and a spring 7, which bears on the bracket and on a collar 8 on the plunger, serves to hold the plunger normally elevated. A foot plate 9 is provided at the upper end of the plunger where it can be reached conveniently by the driver.

Extending laterally from the rear end of the shaft 1 is a crank arm 10 connected by a link 11 to the curved short arm 12 of a semaphore 14 pivotally mounted, as at 15, upon a bracket 16 secured to the back portion of the body B. Spaced contacts 17 are connected to the bracket 16 and are electrically connected with batteries not shown. Another pair of contacts 18 are carried by the semaphore arm and are adapted, when the arm is raised, to engage the contacts 17 and thus complete a circuit to a lamp 19 carried by the semaphore.

When the foot plate 9 is depressed against the action of its spring 7 the semaphore arm will be swung upwardly and laterally and the lamp will be lighted. By providing two of the attachments, one at each side, either semaphore can be actuated by depressing the proper foot piece 9.

What is claimed is:—

A direction signal for vehicles including a longitudinally extending rock shaft having lateral crank arms at the ends thereof extending in opposite directions, a lever fulcrumed between its ends and having one of its arms pivotally connected to one of the crank arms, a vertically movable spring retracted plunger connected to the other arm of the lever, a semaphore having a short laterally curved arm pivotally mounted at its base, a link connecting the free end of said arm with the crank arm on the shaft remote from the lever.

In testimony that we claim the foregoing as our own, we have hereto affixed our signatures in the presence of two witnesses.

ROBERT E. DIAL.
JOSEPH C. STARK.

Witnesses
J. CARROLL,
LEW WILLSON.